United States Patent [19]

Mangravite, Jr.

[11] Patent Number: 4,784,776

[45] Date of Patent: Nov. 15, 1988

[54] PROCESS FOR TREATING AQUEOUS SUSPENSION

[75] Inventor: Francis J. Mangravite, Jr., Plano, Tex.

[73] Assignee: Pony Industries, Inc., New York, N.Y.

[21] Appl. No.: 897,568

[22] Filed: Sep. 19, 1986

Related U.S. Application Data

[63] Continuation of Ser. No. 609,609, May 14, 1984, abandoned.

[51] Int. Cl.$^4$ ................................................. C02F 1/56
[52] U.S. Cl. ..................................... 210/728; 210/735
[58] Field of Search ................ 210/735, 736, 723, 728

[56] References Cited

U.S. PATENT DOCUMENTS

| | | | |
|---|---|---|---|
| 3,285,849 | 11/1966 | Watanabe et al. | 210/735 X |
| 3,377,274 | 4/1968 | Burke et al. | 210/736 X |
| 3,391,090 | 7/1968 | Schiegg | 210/736 X |
| 3,894,945 | 7/1975 | Panzer et al. | 210/736 |
| 3,968,037 | 7/1976 | Morgan et al. | 210/735 X |
| 4,077,930 | 3/1978 | Lim et al. | 210/735 X |

Primary Examiner—Tom Wyse
Attorney, Agent, or Firm—J. R. Magnone; A. J. Good

[57] ABSTRACT

Blends of formaldehyde-based aminoplast resins and water-soluble amines are employed in the purifications of aqueous liquids which contain suspended matter.

3 Claims, No Drawings

PROCESS FOR TREATING AQUEOUS SUSPENSION

This is a continuation of application Ser. No. 609,609 filed May 14, 1984, abandoned.

BACKGROUND OF THE INVENTION

This invention relates to novel waterdispersible polymeric compounds and more particularly to blends of water-dispersible melamine/formaldehyde and/or urea/formaldehyde resins with cationic water-soluble polymeric amine compounds which are useful in the treatment of aqueous liquids to remove undesired suspended matter.

The removal of suspended matter from aqueous systems by the use of chemical agents has been practiced for many years. This treatment has been used to recover valuable solid materials from water, for instance, after water washing steps in mining operations and in emulsion polymerization. Treatment with chemical agents has also been used to purify aqueous systems, such as effluent water from industrial waste treatment facilities and from sewage treatment plants.

The most widely used class of water treatment chemical agents are the cationic agents. In the past, it was customary to use substances such as alum and ferric salts for this purpose. However, these salts leave a lot to be desired from the standpoint of efficiency and overall cost. High molecular weight polymeric compounds have been found to be quite efficient for the removal of suspended matter from aqueous systems. For example, it is known to use water-dispersible melamine or melamine-formaldehyde resins to remove suspended solids from water. Cationic polymers such as polyquaternary ammonium compounds have also been used for this purpose.

PRIOR ART

Many patents and publications, such as the following, teach the use of cationic polymers as agents for aiding in the removal of suspended matter from aqueous systems. German Auslegeschrift No. 1,111,144, published July 20, 1961 and U.S. Pat. Nos. 2,454,547, 3,259,570, Re. 28,807 and Re. 28,808 disclose the preparation of polyquaternary ammonium compounds which are useful as flocculating agents for aqueous systems. U.S. Pat. No. 3,894,944 teaches the use of the polymers described in Re. 28,807 for water clarification. U.S. Pat. Nos. 3,894,945; 3,894,946 and 3,894,948 teach the use of the polymers described in Re. 28,808 for water clarification, treatment of flocculatable industrial wastes and treatment of sewage sludges. U.S. Pat. No. 4,045,377 discloses the use of polyquaternary ammonium compounds prepared by the reaction of dialkylamines, difunctional epoxides and condensation polymers prepared from dicyanamide and a polyalkylenepolyamine as flocculating agents for aqueous systems. U.S. Pat. No. 3,461,163 teaches the preparation of diallyldimethylammonium chloride polymers which are useful as flocculants for water treatment. U.S. Pat. No. 3,165,465 discloses the use of mixtures of cationic flocculants and guar gum, gelatin, carboxymethyl cellulose and polyacrylamide to clarify water which contains suspended mineral solids.

The treatment of aqueous liquids with melamine-formaldehyde resins and melamine-urea-formaldehyde resins has also been described in publications. U.S. Pat. No. 3,716,483 discloses the use of water-insoluble melamine-formaldehyde and urea-formaldehyde resins for the removal of organic substances from water. U.S. Pat. No. 3,484,837 discloses the use of melamine-formaldehyde resins or polyamine-modified urea-formaldehyde resins such as melamine-urea-formaldehyde resins for the removal of organic or inorganic contaminants from waste water systems. Acid alum may be used in combination with these resins. Japanese Pat. No. 71 10,408 teaches the separation of solid organic waste from water using water-soluble cationic aniline-formaldehyde resins treated with melamine and a cationic polyethylenemine.

These patents illustrate the considerable effort that has been applied to the development of highly efficient flocculating and coagulating agents. Because of rigid environmental standards there is a continuing need for new and improved flocculating and coagulating agents.

SUMMARY OF THE INVENTION

New cationic polymer compositions which are useful for water treatment applications have now been discovered. Accordingly, it is an object of the invention to present novel cationic polymer compositions. It is another object of the invention to present new water treating agents. It is another object of the invention to present an improved process for removing suspended matter from aqueous liquids. These and other objects of the invention are supported in the following description and examples.

The novel water-dispersible polymeric compositions of the invention are blends comprising a major amount of one or more melamine-formaldehyde, urea-formaldehyde or melamine-urea-formaldehyde resins or mixtures of these and a minor amount of one or more water-soluble amine polymers. The preferred water-soluble amine polymers are the diallyldialkylammonium halides and ammonia- or polyfunctional amine-epoxy compound reaction products. The relative concentrations of the formaldehyde-based resin component and the water-soluble amine polymer component are usually in the range of about 60 to 99% of formaldehyde-containing resin component and about 1 to 40% of water-soluble amine polymer and are preferably in the range of about 80 to 98% of formaldehyde resin component and about 2 to 20% of water-soluble amine polymer, based on the total weight of formaldehyde-based resin and water-soluble amine polymer.

DETAILED DESCRIPTION OF THE INVENTION

The water dispersible aminoplast resins useable in the invention are reaction products of aldehydes and nitrogen-containing compounds which condense with aldehydes to form thermosetting resins. The preferred aldehyde is formaldehyde, although other aldehydes, such as acetaldehyde, acrolein, crotonaldehyde, etc. may be used. Formaldehyde may be used in the gaseous state or in one of its polymer forms, such as paraformaldehyde or formalin.

The nitrogen containing aminoplast resin-forming compound may be urea, melamine, thiourea, guanadine, dicyandiamide, dicyanamidine, alkylureas, cyclic alkyleneureas, aminotriazines other than melamine, such as melam, melem, ammelide, and ammeline, substituted melamines, such as butyl- or phenylmelamine, guanamines, such as acetoguanamine, benzoguanamine, tetrahydrobenzoguanamine, stearoguanamine, etc. The preferred nitrogen-containing aminoplast resin-forming compounds are urea, melamine and mixtures of these. The particular aminoplast-forming reactants used in the invention will depend upon the use intended for the product. The preferred aminoplast resins are urea-formaldehyde resin, melamime-formaldehyde resin and urea-melamine-formaldehyde resin. To simplify the discussion the aminoplast-forming nitrogen compound will simply be referred to as melamine and formaldehyde will be used as representative of the aldehyde component.

Suitable water-dispersible melamine-formaldehyde resins are prepared by reacting formaldehyde and melamine in the ratio of about 1 to 10 and usually about 2 to 8 moles of formaldehyde per mole of melamine. The product may be made cationic by reaction with an acid such as hydrochloric acid. The preparation of the melamine-formaldehyde resin is not a part of the invention. Any of the well-known melamine-formaldehyde products which are sold for water-treatment or flocculation may be used in the invention or, if desired, particular melamine-formaldehyde resins may be made. The preparation of typical useful melamine-formaldehyde resins is described in U.S. Pat. Nos. 2,345,543, 2,417,014, 2,564,925, 2,485,079, 2,485,080, 2,986,489, 3,117,106, 3,428,607, 3,484,837, and 3,716,483 and Canadian Pat. No. 1,012,666, the disclosures of which are incorporated herein by reference. The melamine-formaldehyde resin is cured sufficiently to render the product water-dispersible but is not cured so hard as to form an insoluble and infusible product. The melamine-formaldehyde resin is usually used in the form of a colloidal suspension.

The melamine-formaldehyde resin may contain other additives, such as other water treating chemicals, for example, alum, pH adjusters, etc.

The water-soluble polyamine compound is a polymeric compound containing repeating amine or substituted amine groups. The polyamine compound may be substantially quaternized or it may contain non-quaternary amine groups, depending on the particular reactants used in the preparation of the water-soluble polyamine. The polyamine compound may be prepared by the addition polymerization of diallyl quaternary ammonium salt, which results in the formation of a fully quaternized ammonium salt polymer, as described below, or by the condensation of a difunctional epoxy compound with ammonia or an amine having a functionality of at least two. In the present context the term functionality relates to the ability of the epoxy compound and the amine compound to react. Polymers prepared from ammonia or a polyfunctional amine may have a substantial number of quaternary ammonium units, as do the products prepared in U.S. Pat. Nos. Re. 28,807 and Re. 28,808, or they may be substantially free of quaternary ammonium groups, as are the products prepared in U.S. Pat. No. 3,248,353. Other U.S. patents which show suitable water-soluble polymeric amines are U.S. Pat. Nos. 3,391,090, 3,577,313 and 3,655,506. Further details of the products formed by the reaction of amines and epoxy compounds are set forth below. The disclosures of all of these patents are incorporated herein by reference to show the wide range of amines useable in the preparation of suitable water-soluble amine polymers and the preparation of such polymers.

The diallylic quaternary ammonium polymers useable in the invention may be made from any diallylic ammonium compounds which form environmentally acceptable water-soluble polymers. Suitable diallylic ammonium compounds are those having the structural formula

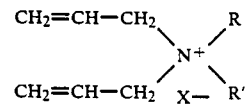

wherein R and R' are organic radicals which are free of substituents which would unduly interfere with the formation of environmentally acceptable water-swellable polymers and X is an environmentally acceptable anion. Thus R and R' may be hydrocarbon radicals, such as saturated aliphatic and cycloaliphatic hydrocarbon radicals, aromatic hydrocarbon radicals and substituted hydrocarbon radicals, such as carboxylates, ethers, alcohols, esters, etc. R and R' may be the same or different radicals. R and R' may also be joined together to form a nitrogencontaining ring compound. As indicated above, the only restrictions on R and R' is that they do not, to an unacceptable degree, adversely interfere with the ability of the monomer to form the desired polymeric product, that they do not prevent the polymeric product from performing in the intended manner and that they do not result in the formation of environmentally unacceptable products. Thus, subject to these restrictions, R and R' may have any number of carbon atoms or be any substituents. Preferred diallylic quaternary ammonium salt polymers are those in which R and R' are saturated aliphatic or cycloaliphatic hydrocarbons having 1 to 20 and more preferably 1 to 6 carbon atoms.

The radical X in the above formula may represent an anion which likewise must not, to an unacceptable extent, interfere with the ability of the monomer to form the desired product, interfere with the desired performance of the desired product or result in the formation of environmentally unacceptable products. X may be an inorganic anion, such as halide, nitrate, nitrite, phosphate, etc. ion, or an organic anion, such as acetate, proprionate, etc. radical. In the preferred embodiment X is a halide ion. Preferred halide ions are the chloride and bromide ions.

Typical of compounds falling within the scope of the above description are aliphatic and aromatic diallyldihydrocarbylammonium salts, such as diallyldimethylammonium chloride, diallydimethylammonium bromide, diallyldiethylammonium chloride, diallylethylmethylammonium chloride, diallyldidecylammonium bromide, diallydibenzylammonium chloride, diallylbenzylmethylammonium bromide, diallydimethylammonium nitrate, diallyldiethylammonium acetate, etc; and diallyldiorganoammonium salts containing hetero atoms, such as N,N-diallyl-N,N-diethoxymethylammonium chloride, N,N-diallyl-N,N-dicarboxypropylammonium chloride, etc. Preferred diallylammonium salts are the diallyldihydrocarbylammonium halides, particularly the diallyldialkyl ammonium salts of chlorine and bromine, such as diallyldimethylammonium chloride, diallydimethylammonium bromide, diallydiethylammonium chloride, diallylethylmethylammonium chloride, etc.

The diallyl quaternary ammonium salt may be copolymerized with one or more other water-soluble monofunctional vinyl compounds which are copolymerizable with the diallylic quaternary ammonium compounds. Examples of suitable monofunctional vinyl compounds are acrylic type acids and their alkali metal salts and esters, such as acrylic acid, methacrylic acid, sodium acrylate, ethyl acrylate, etc.; other unsaturated acids and derivatives thereof, such as maleic anhydride, fumaric acid, etc; acrylamides; and other suitable vinyl compounds, such as vinyl acetate, vinyl pyrrolidone, etc.

The diallyl quaternary ammonium salts may be prepared by any of the known methods for polymerizing such monomers. For instance these salts may be polymerized in water or a polar solvent or in an inverse emulsion or suspension, i.e. water-in-oil suspension, using a free radical-generating catalyst. A typical procedure for preparing suitable water-soluble diallylic quaternary ammonium polymers is described in U.S. Pat. Nos. 2,926,161 and Re. 28,543, both of which are incorporated herein by reference. The method of preparation of the diallyl quaternary ammonium salt polymers is not a part of this invention.

As noted above, the water-soluble amine polymer may also be prepared by reacting ammonia or a polyfunctional amine component with a difunctional epoxide compound. The polyfunctional amine compounds useable in preparing the products of the invention include simple primary or secondary amines or polyamine compounds. The simple amines, i.e. those containing only one nitrogen atom, may be straight- or branch-chained alkyl amines whose alkyl groups have 1 to 6 or more carbon atoms. In the case of dialkylamines the alkyl groups may be identical or different. The alkylamines may be substituted with oxygen or other hetero atoms, provided that the substituents do not prevent the amine from forming the desired water-soluble polymer. The preferred simple amines are the monoalkylamines and dialkylamines whose alkyl groups have 1 to 4 carbon atoms. Suitable simple amines include methylamine, ethylamine, dimethylamine, diethylamine, dihexylamine, bis(2-methylpropyl)amine, ethylmethylamine methylbutylamine, hydroxypropylamine, dihydroxyethylamine, etc. Preferred simple amines include methylamine, ethylamine, dimethylamine, diethylamine, etc.

Polyamines useful in preparing the water-soluble amine polymers of the invention include linear or branched alkylenediamines having about 2 to 6 or more alkylene carbon atoms and polyalkylene polyamines having 2 or more nitrogen atoms and whose alkylene groups each have 2 to 6 or more carbon atoms. The polyamines may be unsubstituted or may be substituted with oxygen or other hetero atoms, provided that the substituent does not interfere with the formation of the desired water-soluble polymer. The polyamine may also be the reaction product of a polyamine and a polybasic organic acid such as the reaction product of triethylenetetraamine and adipic acid. The preferred polyamines are the lower alkylene polyamines and polyethylene polyamines wherein the alkylene groups contain 2 to 4 carbon atoms, such as ethylene diamine, propylenediamine, diethylenetriamine, etc. Suitable simple amines and polyamines are described in more detail in the patents referred to above.

The difunctional epoxy compound may be an epihalohydrin or a diepoxide or a precursor for either of these. Epihalohydrins which may be used include epichlorohydrin, epibromohydrin and epiiodohydrin. Diepoxides which are useable in the invention include ethylene glycol diglycidyl ether, 1,4-butanedioldiglycidyl ether, etc. Precursors of these groups of compounds include 1,3-dihalopropanol-2, such as 1,3-dichloropropanol-2, the precursor for epichlorohydrin, and 1,4-dichloro,2,3-dihydroxybutane, the precursor for 1,3-butanediepoxide. The precursors are converted into the corresponding epihalohydrin or diepoxide under alkaline conditions. The preferred epoxy compounds are epichlorohydrin and 1,4-butanediol-diglycidyl ether. Longer chained diepoxides may be used in preparing the products of the invention but these are not as desirable as the above-named compounds because of higher cost and lower reactivity. The epoxy compounds are described in more detail in the above-mentioned patents.

The water-soluble polymeric amine compound is generally prepared by reacting the amine component or components with the epoxy component, at a ratio of 0.8 to 1.1 and more often at a ratio of 9.9 to 1.05 equivalents of epoxy component per equivalent of total amine.

The preparation of the water-soluble polymeric amine compounds forms no part of this invention. These compounds may be prepared by the methods shown in the above-cited patents, particularly U.S. Pat. Nos. 3,248,353, Re. 28807 and Re. 28808.

The blends of the invention may be prepared by any convenient method. The water-dispersible melamine-formaldehyde resin, generally in the form of a syrup, is usually added to an acid, such as hydrochloric acid to prevent it from undergoing further polymerization or crosslinking to an insoluble product. The water-soluble amine polymer may be added to the syrup prior to, simultaneously with or subsequently to the addition of the aqueous acid solution used to acidify the melamine-formaldehyde resin. The method of blending is, of course, not critical and the method selected will depend upon the polymeric system and the particular end use contemplated. With respect to the use aspect of the invention the melamine-formaldehyde and water-soluble amine polymers are added to the aqueous liquid being treated as a blend, generally prepared as described above.

The amount of the compositions added to the aqueous liquid being treated will depend upon the condition of the aqueous liquid and the ratio of the melamine-formaldehyde-water soluble amine. Lightly contaminated aqueous liquids will, of course, require less of the treating compositions than more highly contaminated aqueous liquids. In general, the desired result can be obtained by the addition of about 1 to 5000 ppm and often about 10 to 1000 ppm of the compositions of the invention to the aqueous liquid.

The compositions of the invention can be used for the treatment of drinking water, waste water and aqueous sludges in such applications as clarification, filtration, softening, flotation, sludge dewatering, recovery of oil from only aqueous sludges, etc.

The invention is further illustrated in the following examples in which weights and percentages are on a weight basis, unless otherwise indicated. The diallyl-dimethylammonium chloride (DADMAC) polymer used in the examples had a viscosity of 100 centipoise at 20 weight percent aqueous concentration.

EXAMPLE I

Part A

An "acid water" solution was prepared by dissolving 91.61 gm of concentrated hydrochloric acid (37%) in 2587.04 of tap water. Separately, a melamine-formaldehyde "syrup" was prepared by combining 124.20 gm of melamine and 175.80 gm of 37% aqueous solution of formaldehyde, adjusting the pH of the resulting mixture to 7.5 with 1.0 N sodium hydroxide and heating the mixture to and maintaining it at 150° F. (65.5° C.) until the melamine dissolved to produce the syrup.

Part B

A melamine-formaldehyde polymer was prepared by combining 8.52 gm of the melamine-formaldehyde syrup prepared in Part A with 81.93 gm of the acid water prepared in Part A. The resulting mixture was permitted to cool yielding an aqueous dispersion of melamine-formaldehyde resin at a concentration of 7.04 weight percent.

EXAMPLE II

A 90:10 weight ratio-blend of melamine-formaldehyde resin and a poly (DADMAC) polymer was prepared by blending 7.67 gm of the melamineformaldehyde syrup prepared in Part A of Example I with a mixture of 73.76 gms of the acid water prepared in Part A of Example I and 9.02 gms of 7.09 weight percent poly(DADMAC) solution. The resulting product had a total actives concentration of 7.04 weight percent.

EXAMPLE III

A 90:10 weight ratio blend of melamine-formaldehyde resin and poly (DADMAC) blend was prepared by blending 81.43 gms of the melamine-formaldehyde resin prepared in Example I, Part B with 9.02 gms of 7.09 weight percent poly(DADMAC) solution, the pH of which was adjusted to 1.8 with hydrochloric acid. The total actives concentration was 7.04 weight percent.

EXAMPLE IV

The products of Examples II and III were evaluated for water clarification efficiency by mixing varying amounts of the products with 500 ml samples of coal pile runoff water having a turbidity greater than 200 NTU's. The resulting mixtures were stirred at 100 rpm for 3 minutes and then at 30 rpm for 2 minutes. The mixtures were then allowed to settle for 10 minutes and test portions of the supernatent were drawn. The turbidity of the test portions was measured using a Hach 2100 A turbidimeter. The results are tablulated in the Table.

EXAMPLE V (COMPARATIVE)

To show that blends of melamine-formaldehyde resin and poly(DADMAC) are more efficient than separate additions of these materials the following runs were carried out: Portions of the melamine-formaldehyde resin prepared in Example I and the 20 weight % poly(DADMAC) solution were separately injected into a 500 ml sample of the coal pile runoff water described in Example IV at dosages to provide the same ratio of the active components as was used in the corresponding Example II and III products. The turbidity of these samples was measured according to the procedure of Example IV. The results are tabulated in the Table as Runs 3, 6, 9 and 12. In the Table the dosages of the melamine-formaldehyde resin are 9, 6, 12.0, 14.4 and 19.2 ppm and the dosages of the poly (DADMAC) are 0.4, 0.5, 0.6 and 0.8 ppm, respectively.

TABLE

| Run | Additive | Total Additive Conc, ppm | Turbidity, NTU |
| --- | --- | --- | --- |
| Control | | | >200 |
| 1 | Ex II Prod. | 10 | 66 |
| 2 | Ex. III Prod. | 10 | 98 |
| 3 | Ex. V Prod. | 10 | 104 |
| 4 | Ex. II Prod. | 12.5 | 50 |
| 5 | Ex. III Prod. | 12.5 | 56 |
| 6 | Ex. V. Prod. | 12.5 | 65 |
| 7 | Ex. II Prod. | 15 | 44 |
| 8 | Ex. III Prod. | 15 | 48 |
| 9 | Ex. V. Prod. | 15 | 58 |
| 10 | Ex. II Prod. | 20 | 36 |
| 11 | Ex. III Prod. | 20 | 37 |
| 12 | Ex. V. Prod. | 20 | 39 |

The results tabulated in the TABLE show the benefits of the invention. Blends of melamine-formaldehyde resin with poly(DADMAC) prepared by different techniques provided significantly better water clarification than an equal weight quantity of melamine-formaldehyde resin and poly(DADMAC) used in combination but added separately. The amount of improvement will vary depending upon the optimum concentration of the components of the blend. The optimum concentrations of each component depends on the particular resins and polymers employed and the particular aqueous system being treated.

Although the invention has been illustrated by specific embodiments it is contemplated that modifications can be made. Thus, other formaldehyde resins, such as urea-formaldehyde resin, and other water-soluble amine polymers can be used. Also, the blends of the invention can be prepared by other procedures. The scope of the invention is limited only by the breadth of the appended claims.

I claim:

1. An improved process for removing suspended matter from coal pile run-off water comprising contacting said coal pile run-off water with a flocculating agent comprising a mixture of a water dispersible melamine-formaldehyde resin and a diallyldialkylammonium halide polymer, the weight ratio of said water dispersible resin to said polymer being about 90:10.

2. The improved process of claim 1, wherein said diallyldialkylammonium halide comprises diallyldimethylammonium chloride, diallyldimethylammonium bromide, diallyldiethylammonium chloride, diallylethylmethylammonium chloride or diallyldidecylammonium bromide.

3. The improved process of claim 2, wherein said diallyldialkylammonium halide is diallyldimethylammonium chloride.

* * * * *